(12) United States Patent  
Shepard et al.

(10) Patent No.: US 9,184,650 B2
(45) Date of Patent: Nov. 10, 2015

(54) SYSTEMS, METHODS, AND APPARATUS FOR CONTROLLING POWER SEMICONDUCTOR DEVICES

(71) Applicant: General Electric Company, Schenectady, NY (US)

(72) Inventors: Mark E. Shepard, Salem, VA (US); Todd David Greenleaf, Salem, VA (US); Alan Carroll Lovell, Salem, VA (US)

(73) Assignee: General Electric Company, Schenectady, NY (US)

( * ) Notice: Subject to any disclaimer, the term of this patent is extended or adjusted under 35 U.S.C. 154(b) by 257 days.

(21) Appl. No.: 13/648,816

(22) Filed: Oct. 10, 2012

(65) Prior Publication Data

US 2014/0097886 A1 Apr. 10, 2014

(51) Int. Cl.
*H02M 1/08* (2006.01)
*H02M 1/00* (2007.01)

(52) U.S. Cl.
CPC ........ *H02M 1/08* (2013.01); *H02M 2001/0012* (2013.01)

(58) Field of Classification Search
None
See application file for complete search history.

(56) References Cited

U.S. PATENT DOCUMENTS

| 2006/0050666 A1* | 3/2006 | Odenwalder | 370/335 |
| 2006/0242350 A1* | 10/2006 | Worley, Sr. | 710/305 |
| 2008/0198904 A1* | 8/2008 | Chang | 375/146 |

* cited by examiner

*Primary Examiner* — Paul Yanchus, III
(74) *Attorney, Agent, or Firm* — Meunier Carlin & Curfman LLC

(57) ABSTRACT

Systems, methods, and apparatus for controlling power semiconductor devices are described. According to one embodiment of the disclosure, there is disclosed a system. The system may include at least one power source for selectively providing power to one or more power semiconductor devices controlled by a gate driver. The gate driver may include at least one controller coupled to at least one power semiconductor device interface via a first channel and a second channel configured to provide galvanic isolation of information communicated between the controller and the at least one power semiconductor device interface.

17 Claims, 4 Drawing Sheets

US 9,184,650 B2

SYSTEMS, METHODS, AND APPARATUS FOR CONTROLLING POWER SEMICONDUCTOR DEVICES

FIELD OF THE DISCLOSURE

Embodiments of the disclosure relate generally to power control, and more specifically to systems, methods, and apparatus for controlling power semiconductor devices.

BACKGROUND OF THE DISCLOSURE

Control systems are utilized in a wide variety of different applications. For example, control systems are utilized in conjunction with one or more power generating devices in power plants and/or in process plants. Control systems typically include a controller in communication with one or more components of the control system via one or more communications channels. However, conventional control systems are not designed to handle voluminous amounts of data communications. As such, only limited data may be communicated and/or processed.

BRIEF DESCRIPTION OF THE DISCLOSURE

Some or all of the above needs and/or problems may be addressed by certain embodiments of the disclosure. Embodiments of the disclosure may include systems, methods, and apparatus for controlling one or more power semiconductor devices. According to one embodiment of the disclosure, there is disclosed a system. The system may include at least one power source for selectively providing power to one or more power semiconductor devices controlled by a gate driver. The gate driver may include at least one controller coupled to at least one power semiconductor device interface via a first channel and a second channel configured to provide galvanic isolation of information communicated between the controller and the at least one power semiconductor device interface.

According to another embodiment of the disclosure, there is disclosed an apparatus. The apparatus may include a controller coupled to at least one power semiconductor device interface via a first channel and a second channel. The first and the second channel may include a multiplexor, a demultiplexor, an encoder, and/or a decoder configured to provide galvanic isolation of information communicated between the controller and at least one power semiconductor device interface.

According to yet another embodiment of the disclosure, there is disclosed a method. The method may include providing at least one controller, which can include a first channel and a second channel. The method may further include providing galvanic isolation of one or more signals traversing on at least one of the first channel or the second channel. Additionally, the method may include transmitting information from the at least one controller to at least one power semiconductor device interface via at least one of the first channel or the second channel.

Additional systems, methods, apparatus, features, and aspects are realized through the techniques of various embodiments of the disclosure. Other embodiments and aspects of the disclosure are described in detail herein and are considered a part of the claimed disclosure. Other embodiments and aspects can be understood with reference to the description and the drawings.

BRIEF DESCRIPTION OF THE DRAWINGS

Figure 1:
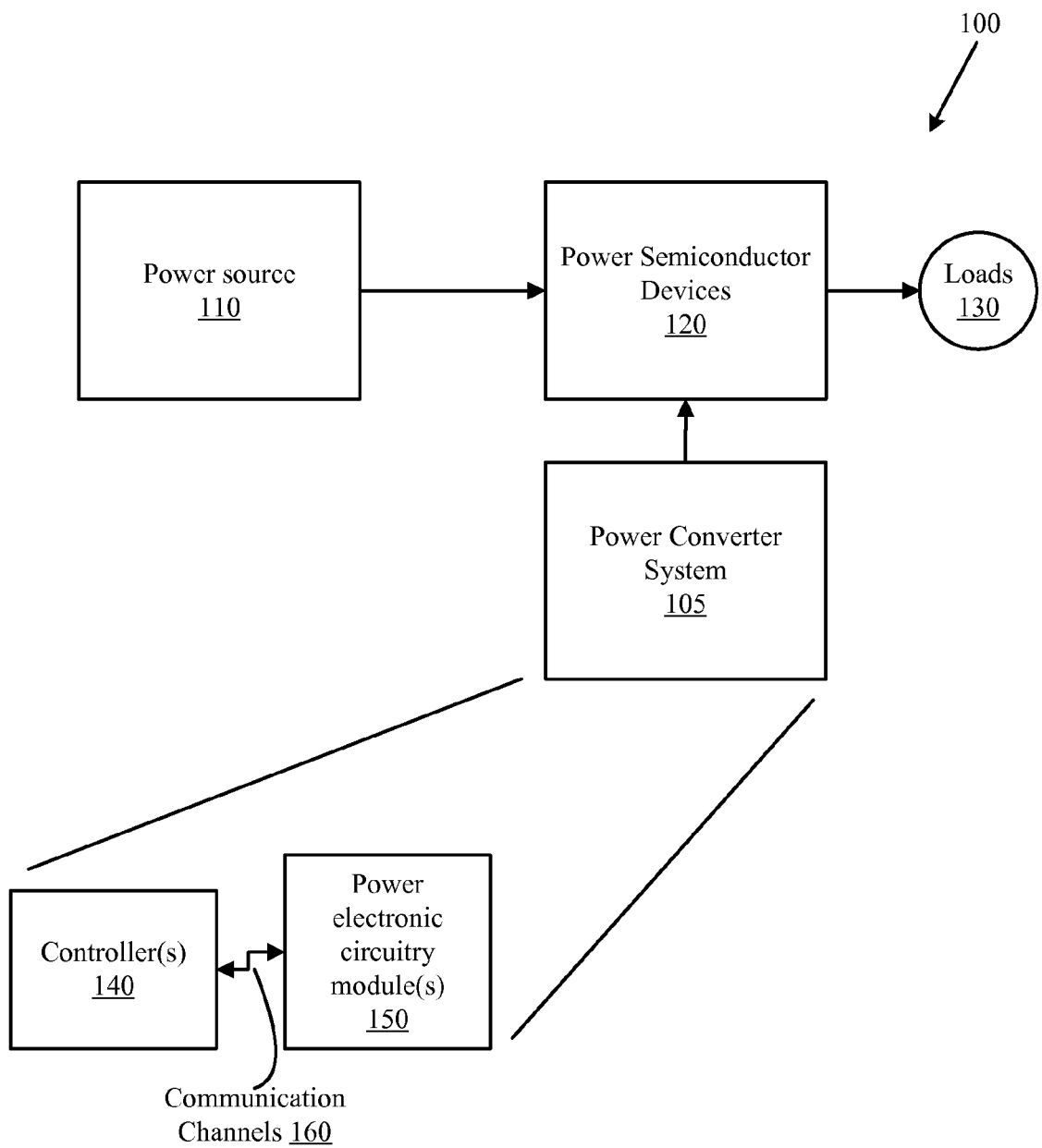

Having thus described the disclosure in general terms, reference will now be made to the accompanying drawings, which are not necessarily drawn to scale, and wherein:

FIG. 1 is a diagram of an example control system according to with various embodiments of the disclosure.

Figure 2:
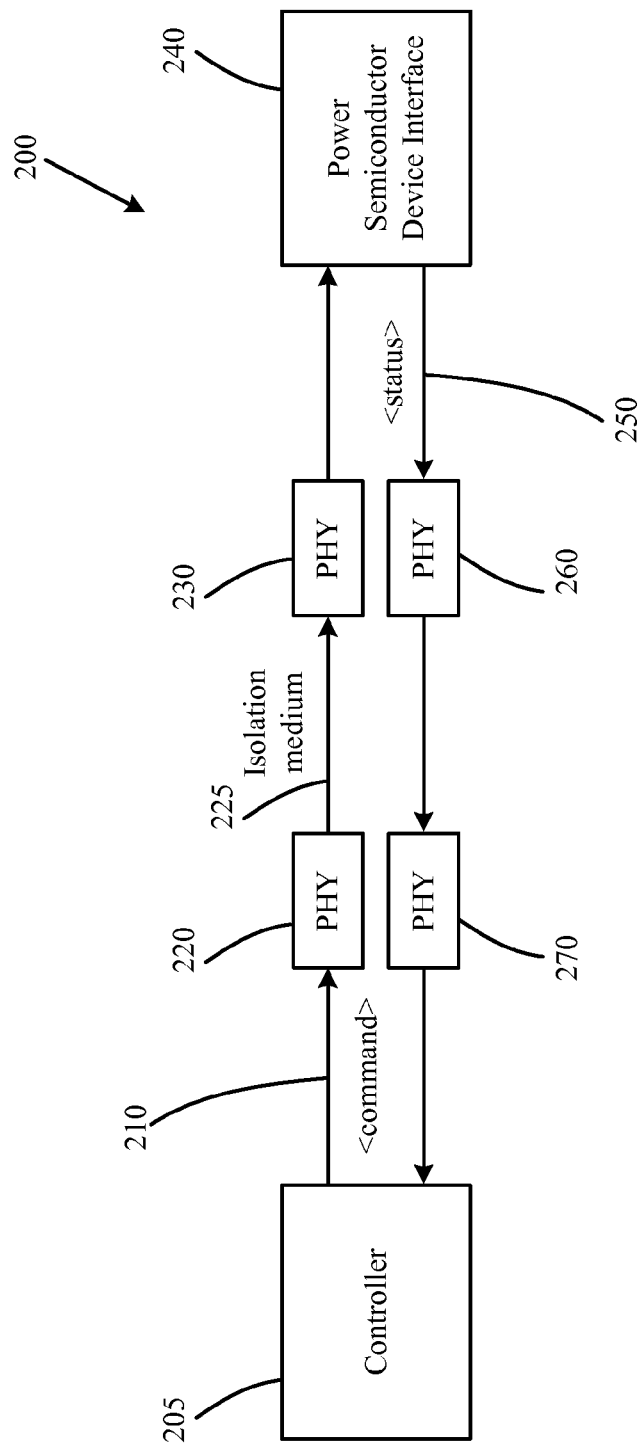

FIG. 2 is a block diagram of conventional communications in a control system according to the prior art.

Figure 3:
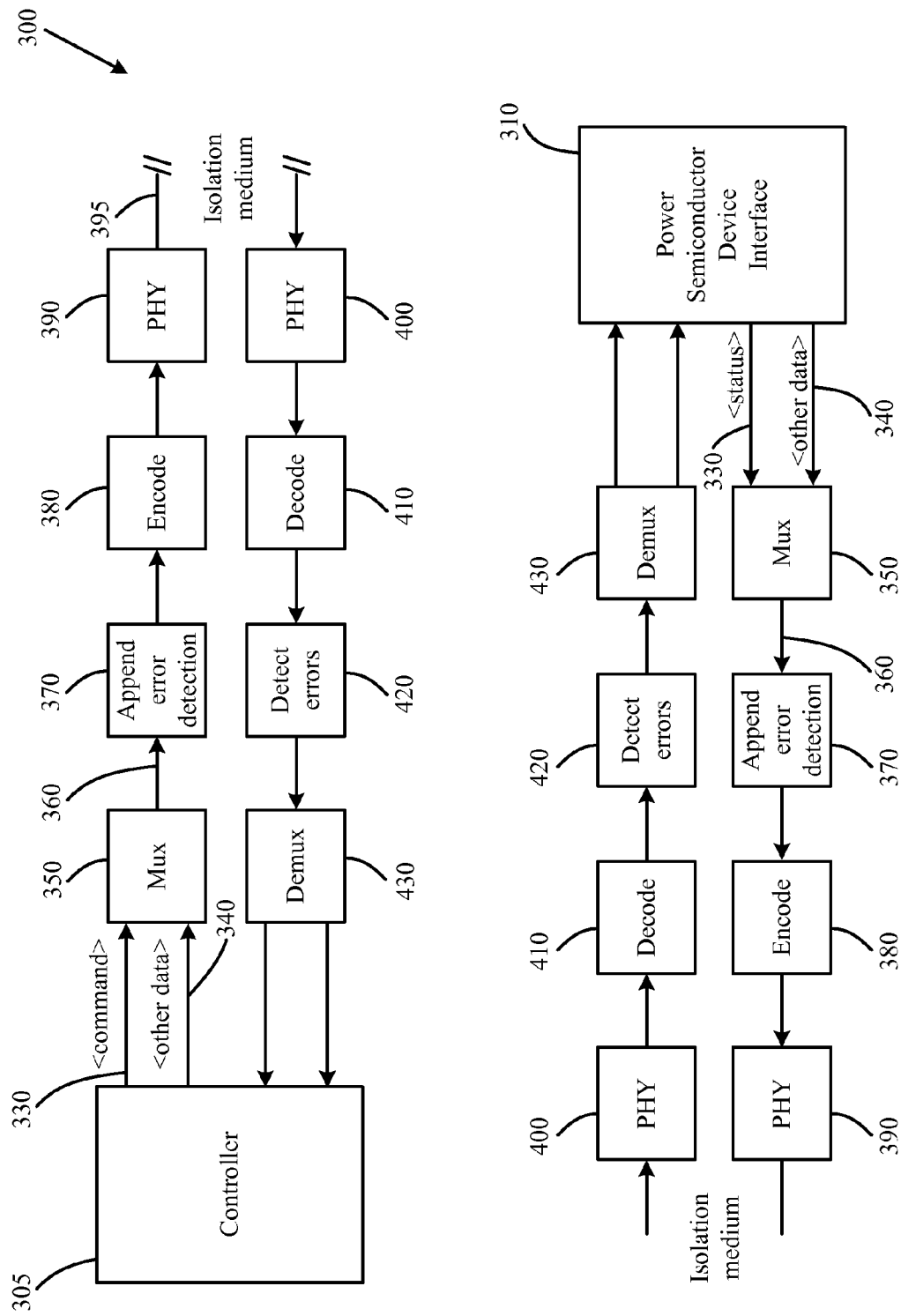

FIG. 3 is a block diagram of an enhanced communication control system according to an embodiment of the disclosure.

Figure 4:
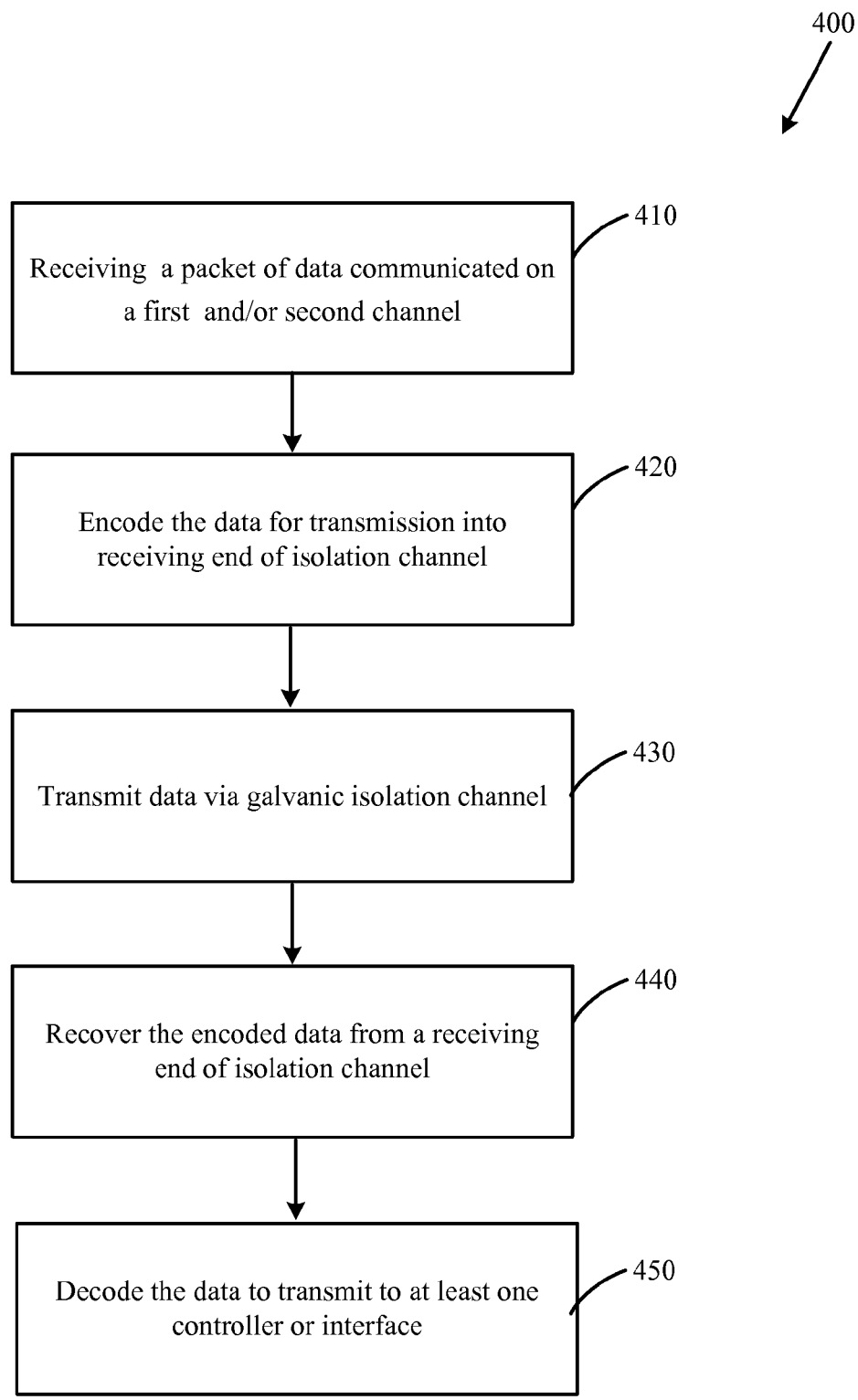

FIG. 4 is a flow chart of one example method for controlling one or more power semiconductor devices according to an embodiment of the disclosure.

DETAILED DESCRIPTION OF THE DISCLOSURE

Illustrative embodiments of the disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. Like numbers refer to like elements throughout.

As briefly discussed above, control systems may be used to control one or more components of a power system, such as, for instance, one or more power semiconductor devices (referred to as "devices") of a power converter system. For instance, FIG. 1 is a schematic representation of a system 100, that includes a power converter system 105 and a power source 110, such as, a generator. The power converter system 105 may include one or more devices 120 that may be used to convert the received power from power source 110 to a desired output voltage and frequency to various loads 130, such as, for instance, motors, power grids and/or resistive loads, etc. As shown in FIG. 1, the power converter system 105 may include a controller 140 to control one or more devices 120 in communication with one or more power electronic circuitry modules 150 via a respective interface and one or more channels.

For instance, shown in FIG. 2, is an example block diagram illustrating data communications conventionally employed between components of a control system 200 that may include, for example, a controller 205 coupled to a respective interface 240 via a command channel 210 and status channel 250. In operation, one or more command signals may be communicated from the controller 205 to the power semiconductor device interface 240 via the command channel 210, where at block 220, the command signal may be converted and carried by to an optical signal that propagates through an isolation medium 225, such as an optical isolation fiber, by an electro-optical device, such as a semiconductor light amplification by stimulated emission of radiation (laser) device. Next, at block 230, another device 230, such as a photodetector, may receive and recover the command signal, or otherwise convert the isolated optical signal to a corresponding electrical signal for communication to the power semiconductor device interface 240. Likewise, one or more status signals may be communicated by the power semiconductor device interface 240 to the controller 205 via the status channel 250. In some embodiments, the status signal may be generated based on various measurement data collected by, for instance, a plurality of sensors configured to monitor and communicate operational data associated with the devices 120 to the interface 240 via one or more suitable network connections. Thereafter, one or more additional transceiver devices 260 may be configured to receive then convert the received status signal to an optical signal that propagates through the isolation fiber, and another receiver device 270 may receive and recover the status signal for communication to the controller 205.

With continued reference to FIG. 2, redundant circuitry associated with various devices, particularly, devices 220, 260, and the devices 230, 270, may be employed in such systems, which may add to cost and complexity of the system and result in relatively limited bandwidth for communicating via channels 210, 250, respectively. As such, the command signal and the status signal may, in some cases, be limited to single binary signals. Therefore, conventional systems may not be configured to carrying an enhanced, or otherwise rich data set, including operating data associated with individual power semiconductors of the power system.

The systems, methods, and apparatus of the disclosure herein may provide relatively higher bandwidth communications architecture employing any variety of communicative links, including serial links Such relatively high bandwidth communicative links may be used for communicating relatively enhanced data providing insight into the operation of the one or more power semiconductor devices, such as power semiconductor devices between one or more processing components. The enhanced data may include a variety of information, such as, for example, a rate of change of voltage or current, a magnetic field intensity, non-physical information as well such as stored digital information and/or asset information. Additionally the enhanced data may include other semiconductor specific information, such as, junction temperature or saturation voltage, and/or asset management information, such as, device serial numbers, hardware revisions or software revisions and potentially other information, that may be processed as will be described.

A serial link may be employed to facilitate communication of enhanced data, such as data pertaining to power semiconductor devices, transferred across each end of the communicative link between a power semiconductor device interface and a controller. In certain embodiments, processing components of a control system may be configured to convert parallel communications to serial communications via the serial link without substantially increasing the complexity of typical computer architectures employed in conventional computer control systems. As described in more detail below, the serial link may be used to facilitate communication of enhanced data between a controller and a power semiconductor device interface ("interface") with a relatively rich dataset that may provide for enhanced control of the power semiconductor devices of the system. For the purposes of this application, power semiconductor devices may include any suitable devices that configured to provide switching functionality for the purposes of directing or controlling the flow of power or for the purposes of providing power to any suitable power load. Power semiconductor devices may include, but are not limited to, insulated gate bipolar transistors (IGBT), metal-oxide-semiconductor field effect transistors (MOSFET), bipolar junction transistors (BJT), heterojunction bipolar transistors (HBT), high electron mobility transistors (HEMT), any suitable junction or field effect transistors, or combinations thereof.

In one example embodiment, the interface may be configured to receive monitoring data associated with one or more devices that provides insight into the operations of the devices by, for instance, one or more sensor devices, via a suitable network communication. Thereafter, the interface may communicate a first set of monitoring data via a first channel and a second set of monitoring data via a second channel to one or more devices configured to receive and multiplex the first and second set of monitoring data. The multiplexed data sets may then be communicated to a serial link communicates the parallel sets of data to the controller. The controller may be configured to receive and process the data in order to identify any potentially damaging events. Based at least in part upon these determinations, the controller may provide one or more control signals that control the operation of one or more power semiconductor devices via the first and second channels, where the serial link may be employed in the same fashion to communicate such data to the interface in a predictable and synchronous fashion, where it may be used for analysis, processing, and/or other purposes.

In another embodiment, the serial link may include one or more devices that process combined data communicated on the first and second channels. The devices may be configured to receive the multiplexed data and provide modulation, clock recovery, adaptive equalization, link establishment and monitoring functions to fully implement the communications link between a controller and respective interface of a control system. In one embodiment, a control interface, such as an application specific integrated circuit (ASIC) or a microcontroller, may control one or more devices associated with the multiplexing of data communicated via the first and second channels, as well as potentially other devices associated with various operations of the serial link.

In yet another embodiment, one or more software programs and/or modules may be used by the control interface to implement the functions described herein. The technical effects of certain embodiments herein may include, but are not limited to, reduced cost and complexity associated with communicating data over one or more communicative channels. In this regard, redundant circuitry may be reduced, as the one or more devices may be used in association with signals communicated across both the first and second channels.

Referring now to FIG. 3, a block diagram of an example computer architecture associated with data communications of a system 300 using a serial link in accordance with the present disclosure, which may include a controller 305 and a power semiconductor device interface 320 is shown. The controller 305 may be configured to output a first signal and a second signal, each signal having one or more data bits via a command channel 330 and a status channel 340, respectively. Thereafter at block 350, data bits of each signal may be combined by, for instance, a multiplexing device configured to receive channels 330, 340 and interleave the data from the channels 330, 340 into a single serial data stream. In various embodiments, multiplexing may be performed relative to a bit clock recovered by and/or from the controller 305 to provide a synchronous clock signal for sampling and/or multiplexing. In operation, one or more data bits of the first and the second signals may be multiplexed, such as into a packet, which may then be transmitted via a serial link 360.

Next, at error checking block 370, the serial link 360 may be configured to add error checking and/or transmission quality checking overhead, such as parity bit(s) and/or cyclic redundancy checks (CRC) to the data packet for the purposes or transmission error detection. In some embodiments, processing at error checking block 370 is performed by one or more electronic devices including one or more processors configured to receive data communicated via the serial link 360 and determine and process the data to append error checking bit(s) and/or information. The processing at error checking block 370 may further include determining requirements for latency, coherency, periodicity, and error detection for the data communicated. For instance, the data communicated via channel 330 may be configured to tolerate an occasional bit error, and thus only minimal error detection is needed, but the data communicated via channel 340 may be configured such that not even a single bit error may occur, and therefore stronger and/or more precise error detection is needed. Processing at error checking block 370 may further include comparing each of the signals, such as those carried by channels 330, 340, in order to identify an error detection method that may be employed.

The error detection appended signal may next be received by encoder 380, where various methods may be employed for encoding the data communicated on the link 360 into a suitable format, modulation, and/or code. The data is encoded according to a selected encoding protocol and is prepared for communication to a corresponding data communications component. The encoder may code and/or modulate the received data signal as the constituent bits of the data signal are received or as blocks and/or data packets of the received bits. The encoded data provided by the encoder 380 may be processed at physical (PHY) block 390, where the encoded data is received by a device, such as a transceiver that may communicate the encoded data into an isolation channel via an isolation medium 395. In one aspect, the PHY block may include an electrical to optical converter in the case of optical galvanic isolation. In this case, the electrical to optical converter may be a laser, a light emitting diode (LED), or the like. The isolation medium 395, in this case may be optical fiber, such as multimode fiber, or any other suitable waveguide. In certain other embodiments, galvanic isolation may be implemented with sonic devices or electrical devices.

A PHY block 400 may receive the one or more output of the isolation channel and recover the encoded data therefrom, such as by converting an optical signal to an electrical signal. Such a process may involve coupling the optical isolation signal to a photodetector to generate an electrical signal corresponding to the isolation optical signal. In certain cases, filters and edge sharpening processes may be implemented to improve the fidelity of the signal transmitted via the galvanic isolation channel.

The system may further include a decoder 410 that may receive the output signal of the PHY block 400 and decode the output signal. In one aspect, the decoder 410 may reverse the encoding performed by the encoder 380. At this point, the decoded signal output by the decoder 410 may be provided to the error detector 420 that may detect errors based at least in part on the error detection overhead provided by the error checking block 370. The error checking may be associated with transmission based errors and may entail parity checks and/or CRC checks. In one aspect, the error detector may remove the error checking overhead as appended by the error check block 370 from the received signals and provide the error check free signal to a demultiplexer 430 that may recover the original channel 330 and 340 signals and provide the same to the power semiconductor device interface 310.

The power semiconductor device interface 310 may also be configured to communicate information and/or data to the controller 305 via status channel 440 and other data channel 450. The elements and processes used to communicate from the power semiconductor device interface 310 to the controller 305 may be substantially similar to the communications from the controller 305 to the power semiconductor device interface 310. In the interest of brevity, the multiplexing, error detection, galvanic isolation, and demultiplexing processes and associated hardware and/or software for communicating from the power semiconductor device interface 310 to the controller 305 will not be repeated here.

Referring now to FIG. 4 is an exemplary flow diagram illustrating an example method 400 for controlling one or more power semiconductor devices according to embodiments of the disclosure. The method 400 may begin at block 410, where one or more packets are received on a first and/or second channel. In certain embodiments, each of the first and second channels may carry different types of data. At block 420, the data received on the first and second channels may be encoded. In one aspect the data may also be multiplexed, such as time multiplexed, to combine the data streams of the first and the second channels. Next, at block 430, the data may be transmitted via a galvanically isolated channel. The process of this transmission may entail converting the encoded signal to one of an optical signal, audio signal, and/or a different electrical signal. In the case of optical galvanic isolation, the encoded signal may modulate a laser diode and the optical output of the laser diode may be transmitted via an optical cable coupled to the laser diode. Thereafter, at block 440, the encoded signal may be retrieved from the galvanic isolation channel. In certain cases, a conversion from an optical signal on the isolation channel to a corresponding electrical signal may be performed. Such an operation may entail the use of a photodetector in the case of optical galvanic isolation. At block 450, the encoded signal may be decoded and provided to one of a controller or a power semiconductor device interface.

In one example, a computing device can perform any, some, or all of the operations of FIG. 4. The processes of FIG. 4 are illustrated as logical flow diagrams, in which each operation represents a sequence of operations that can be implemented in hardware, software, or a combination thereof. In the context of software, the operations can represent computer-executable instructions stored on one or more computer-readable storage media that, when executed by one or more processors, perform the recited operations. Generally, computer-executable instructions can include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

The claimed disclosure is:

1. A system comprising:
   at least one power semiconductor device interface; and
   a communication system coupled to the at least one power semiconductor device interface, the communication system comprising:
   an error detector configured to receive a decoded serial data stream containing error detection overhead bits, and to operate on the decoded serial data stream for detecting errors in at least a first data channel with a first level of precision and errors in a second data channel with a second level of precision, the error detector further configured to remove the error detection overhead bits from the decoded serial data stream; and
   a demultiplexer configured to receive the decoded serial data stream from the error detector after removal of the error detection overhead bits and execute a demultiplexing operation to re-create at least the first data channel and the second data channel.

2. The system of claim 1, wherein the at least one power semiconductor device interface is configured to obtain data from one or more sensors associated with at least one power semiconductor device for communication to at least one controller.

3. The system of claim 2, wherein the data comprises at least one of (i) physical information, (ii) analog information or (iii) digital information.

4. The system of claim 2, wherein the power semiconductor device interface is further configured to transmit the data to the at least one controller via at least one of a third channel or a fourth channel.

5. An apparatus, comprising:
a communications link configured to facilitate communications between a controller and at least one power semiconductor device interface, wherein the communications link provides galvanic isolation of information on a first channel with a first level of tolerance for bit errors and a second channel with a second level of tolerance for bit errors, the communications link comprising a demultiplexer configured to receive a decoded serial data stream from an error detector after removal of error detection overhead bits by the error detector, the demultiplexer further configured to execute a demultiplexing operation to re-create at least the first channel and the second channel.

6. The apparatus of claim 5, wherein the controller is configured to output the information for communication to the at least one power semiconductor device interface via at least one of the first channel or the second channel.

7. The apparatus of claim 5, wherein the at least one power semiconductor device interface is coupled to at least one power semiconductor device.

8. The apparatus of claim 7, wherein the at least one power semiconductor device interface is configured to obtain data from one or more sensors associated with the at least one power semiconductor device.

9. The apparatus of claim 8, wherein the data comprises at least one of (i) a voltage measurement, (ii) a current measurement or (iii) a temperature.

10. The apparatus of claim 9, wherein the controller is configured to receive the data from the at least one power semiconductor device interface via at least one of a third channel or a fourth channel.

11. The apparatus of claim 5, wherein the communications link comprises a multiplexor configured to multiplex the first channel and the second channel.

12. The apparatus of claim 5, wherein the communications link comprises an encoder configured to encode the information communicated on at least one of the first channel or the second channel.

13. The apparatus of claim 12, wherein the communication link further comprises a decoder configured to decode the information communicated on the at least one of the first channel or the second channel and generate therefrom, the decoded serial data stream.

14. A method, comprising:
transmitting information from at least one controller to at least one power semiconductor device interface using a serial data stream comprising at least a first channel with a first level of tolerance for bit errors and a second channel with a second level of tolerance for bit errors;

decoding the serial data stream to obtain a decoded serial data stream;

using error detection overhead bits to detect errors in the decoded serial data stream;

removing the error detection overhead bits after using the error detection overhead bits; and re-creating at least the first data channel and the second data channel by demultiplexing the decoded serial data stream after removal of the error detection overhead bits.

15. The method of claim 14, wherein the method further comprises:
providing at least one multiplexer configured to multiplex information on the first channel and the second channel.

16. The method of claim 14, wherein the at least one power semiconductor device interface is configured to obtain data from one or more sensors associated with at least one power semiconductor device, and wherein the data comprises at least one of (i) physical information, (ii) analog information or (iii) digital information.

17. The method of claim 16, wherein the at least one controller is configured to receive the data from the at least one power semiconductor device interface via at least one of a third channel or a fourth channel.

* * * * *

UNITED STATES PATENT AND TRADEMARK OFFICE
CERTIFICATE OF CORRECTION

| | | |
|---|---|---|
| PATENT NO. | : 9,184,650 B2 | Page 1 of 1 |
| APPLICATION NO. | : 13/648816 | |
| DATED | : November 10, 2015 | |
| INVENTOR(S) | : Shepard et al. | |

It is certified that error appears in the above-identified patent and that said Letters Patent is hereby corrected as shown below:

In The Specification

In Column 3, Line 22, delete "links" and insert -- links. --, therefor.

Signed and Sealed this
Fifth Day of April, 2016

Michelle K. Lee
*Director of the United States Patent and Trademark Office*